(12) United States Patent
Veignat et al.

(10) Patent No.: US 7,114,386 B1
(45) Date of Patent: Oct. 3, 2006

(54) METHOD AND APPARATUS FOR ACQUIRING DATA IN A HYDROCARBON WELL IN PRODUCTION

(75) Inventors: Eric Veignat, Abbeville (FR); Fadhel Rezgui, Sceaux (FR); Jean-Pierre Chyzak, Evry-Gregy sur Yerres (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 290 days.

(21) Appl. No.: 10/031,997

(22) PCT Filed: Jul. 25, 2000

(86) PCT No.: PCT/EP00/07285

§ 371 (c)(1),
(2), (4) Date: Jan. 22, 2002

(87) PCT Pub. No.: WO01/11190

PCT Pub. Date: Feb. 15, 2001

(30) Foreign Application Priority Data

Aug. 5, 1999 (FR) .................................. 99 10197

(51) Int. Cl.
*E21B 47/10* (2006.01)

(52) U.S. Cl. .................................. 73/152.29

(58) Field of Classification Search ............. 73/152.42, 73/152.29, 152.02, 152.31, 861.04; 181/102; 166/250.11
See application file for complete search history.

(56) References Cited

U.S. PATENT DOCUMENTS

| 5,251,479 A | * | 10/1993 | Siegfried, II et al. ..... 73/152.29 |
| 5,561,245 A | * | 10/1996 | Georgi et al. ............ 73/152.02 |
| 5,574,263 A | * | 11/1996 | Roesner ...................... 181/102 |
| 5,633,470 A | * | 5/1997 | Song ....................... 73/861.04 |
| 5,736,637 A | * | 4/1998 | Evans et al. ............. 73/152.31 |
| 6,176,129 B1 | * | 1/2001 | Aguesse et al. ......... 73/152.31 |

FOREIGN PATENT DOCUMENTS

WO          WO 104601 A1 *   1/2001

* cited by examiner

*Primary Examiner*—Daniel S. Larkin
*Assistant Examiner*—John Fitzgerald
(74) *Attorney, Agent, or Firm*—Victor H. Segura; Brigitte L. Echols

(57) ABSTRACT

To acquire data such as the flow rate of various phases of a fluid flowing in a hydrocarbon well (12) in production, in particular in an inclined or horizontal portion of the well, both the local speed of the fluid and the proportions of the various phases are determined in each of at least two distinct regions of the well that are not in alignment with one another parallel to the axis of the well. The regions in which the measurements are taken are advantageously distributed in a vertical plane containing the axis of the well when the well is inclined or horizontal.

13 Claims, 2 Drawing Sheets

METHOD AND APPARATUS FOR ACQUIRING DATA IN A HYDROCARBON WELL IN PRODUCTION

TECHNICAL FIELD

The invention relates to a data acquisition method and apparatus designed to be used in a hydrocarbon well in production.

More precisely, the method and apparatus of the invention are designed to ensure that the production parameters in a hydrocarbon well are monitored, and to enable a diagnosis to be established in the event of an incident.

STATE OF THE ART

To ensure the monitoring and diagnostic functions in hydrocarbon wells in production, a certain amount of data, mainly physical data, has to be acquired. The data essentially relates to the multiphase fluid which flows in the well (flow rate, proportions of its various phases, temperature, pressure, etc.). It can also relate to certain characteristics of the well proper (ovalization, inclination, etc.)

Data that is particularly important for the operator is the average flow rate and the proportion of each of the phases present in the multiphase fluid.

To acquire said data, and as shown in particular by document FR-A-2 732 068, a conventional solution consists in taking, firstly, an overall measurement of the speed of the fluid flowing in the well, by means of a spinner placed in the axis of the well, and secondly, local measurements enabling the proportions of the various phases of the fluid in certain regions of the well to be determined. The speed measurement and the local measurements are taken at various levels. The local measurements are taken by means of local sensors which can be resistivity sensors, optical sensors, etc.

Document FR-A-2 761 111 proposes an improvement to that type of apparatus, in which the overall measurement of the speed of the fluid and the determination of the proportions of the various phases are taken substantially at the same level. Such an apparatus is more compact than conventional apparatuses and avoids certain errors or inaccuracies due to offsets between the measurement points.

To determine the flow rate of the various phases of the fluid flowing in the well, the flow rate of the fluid over the section of the well is calculated from the measurements taken by said existing apparatuses by multiplying the overall speed measured at the center of the well by the section of the well at the place where said measurement is taken. The proportion relating to the phase under consideration as determined by the local sensors is then applied to said overall flow rate.

It is also known that the distribution of the various phases of the fluid flowing in an oil well varies depending on whether the well is vertical, inclined, or horizontal. Because of the difference in density of the various phases of the fluid, said phases become progressively more stratified with increasing inclination of the well. Thus, in the case of a three-phase fluid containing water, oil, and gas, the three phases tend to flow one on top of the other when the well is horizontal or greatly inclined.

To take account of that phenomenon, and as shown in particular in documents GB-A-2 294 074 and GB-A-2 313 196, data acquisition apparatuses have been proposed that are provided with a certain number of local sensors that are distributed in a vertical mid-plane of the well when the tool is brought into its operating position in an inclined or horizontal well.

The arrangement of the local sensors proposed in those documents enables the stratification of the various phases in inclined or horizontal wells to be taken into account in order to determine their proportions in more reliable manner. However, the technique used to determine the flow rate of each of the phases remains the same and is based on determining the overall flow rate of the fluid in the well.

Document GB-A-2 307 047 proposes a data acquisition apparatus intended for horizontal or greatly inclined wells in which there flows a liquid phase together with a large gas phase. That apparatus has various sensors situated in the gas phase and sensors situated in the liquid phase(s). In addition, it measures the speeds of the gas and the liquid phases separately. It also takes a level measurement, by a capacitive system, so as to determine the proportions of the gas and liquid phases.

That apparatus can only be used in wells that are horizontal or greatly inclined. In other words, it cannot be used in wells that are vertical or slightly inclined. In addition, the level measurement technique used does not determine the real proportions of the various phases of the fluid. An intermediate zone generally exists where the gas and the liquid are mixed, thereby causing the level measurement taken to be highly inaccurate. Furthermore, the frequent presence of two liquid phases, such as water and oil, is not taken into account.

SUMMARY OF THE INVENTION

An object of the invention is to provide a data acquisition method and apparatus that enable the flow rate of the various phases of a fluid flowing in an oil well to be determined in more accurate and more reliable manner than with existing apparatuses, in particular when the well is inclined or horizontal.

The invention is based on the observation whereby, in an inclined or horizontal well, the flow rate of any one phase of the fluid is not equal to the product of the overall (or average) speed of the fluid multiplied by the section of the well and by the proportion of said phase in the flowing fluid, but is rather the product of the speed of the phase under consideration multiplied by the section and by the proportion of said phase.

Thus, the invention provides a method of acquiring data in a hydrocarbon well, the method being characterized in that it consists in determining both the local speed of a multiphase fluid flowing in the well and the local proportions of the phases of said fluid in each of at least two distinct regions of the well that are offset from each other parallel to the axis of the well.

The regions in which the measurements are taken are preferably all situated in the same plane containing the axis of the well, or in the vicinity of said plane.

More precisely, said regions are preferably distributed across the entire width of the well.

To ensure the effectiveness of the measurement in an inclined or horizontal well, the plane in which the measurement regions are situated is advantageously oriented in a substantially vertical direction.

One of said regions is thus preferably situated in the vicinity of a top generator line of the well.

A section element (Δsi) of the well is advantageously assigned to each of said regions, and the overall flow rate Q of each of said phases is determined from the relationship:

$$Q = \sum_i q_i \cdot \frac{\Delta si}{S}$$

where S is the total vertical section of the well and $q_i$ is the flow rate of said phase in section element $\Delta s_i$, with $q_i = v_i \cdot h_i$ where $v_i$ is the local speed of said phase in section element Δsi and $h_i$ is the local proportion of said phase in section element Δsi.

The invention also provides apparatus for acquiring data in a hydrocarbon well, the apparatus being characterized in that it comprises, in each of at least two distinct regions of the well that are offset from each other parallel to the axis of the well, means for determining the local speed of a multiphase fluid flowing in the well and means for determining the local proportions of the phases of said fluid.

In a preferred embodiment of the invention, the apparatus comprises a body capable of resting, by gravity, against a bottom generator line of the well, and at least one deployable arm supported by the body at one end and capable of being applied against the top generator line of the well, in which at least some of the means for determining the local speed of the fluid and at least some of the means for determining the local proportions of the phases are supported by the deployable arm.

In another preferred embodiment of the invention, the apparatus comprises a body capable of being centered about the axis of the well by centering means including at least two deployable arms supported by the body and capable of being applied respectively against the bottom generator line and against the top generator line of the well, in which at least some of the means for determining the local speed of the fluid and at least some of the means for determining the local proportions of the phases are supported by the deployable arms.

Depending on circumstances, the means for determining the local speed of the fluid and the means for determining the local proportions of the phases can either be included in the multi-sensor assemblies or they can be separate therefrom. When separate, in each of the measurement regions, the means for determining the local speed of the fluid and the means for determining the local proportions of the phases are substantially in alignment with each other on a line parallel to the axis of the well.

BRIEF DESCRIPTION OF THE DRAWINGS

Various embodiments of the invention are described below as non-limiting examples, and with reference to the accompanying drawings, in which.

DETAILED DESCRIPTION OF PREFERRED EMBODIMENTS OF THE INVENTION

Figure 1:
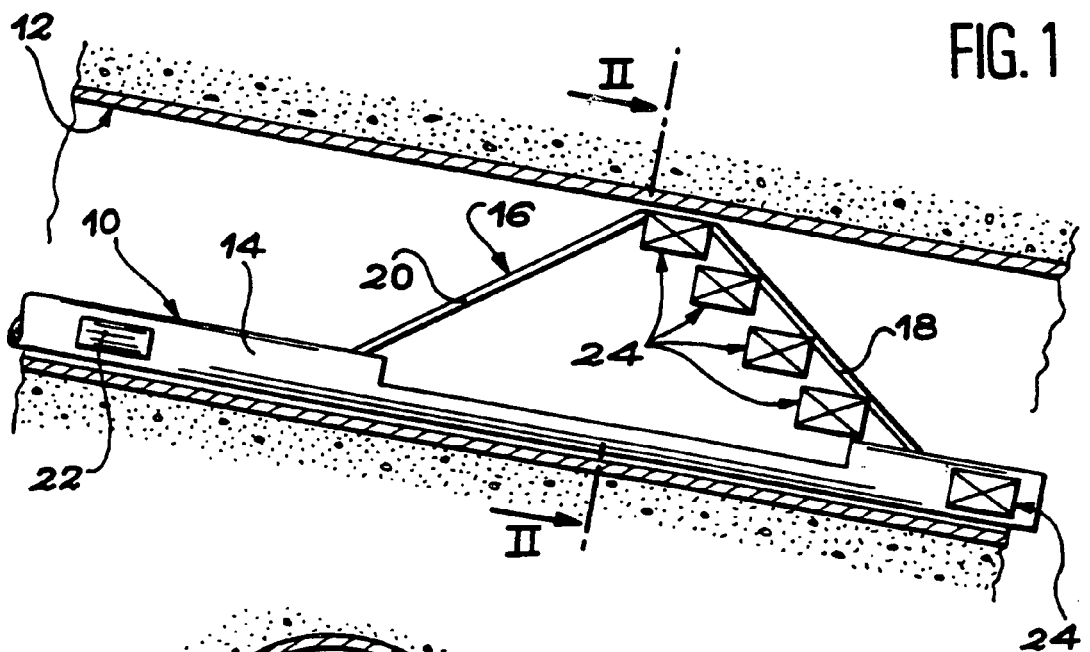
FIG. 1 is a view in longitudinal section showing in diagrammatic manner data acquisition apparatus constituting a first embodiment of the invention in a greatly inclined well.

FIG. 1 shows, very diagrammatically, a portion of data acquisition apparatus 10 placed in a hydrocarbon well 12 in production. More precisely, the portion of the well 12 in which the apparatus 10 is situated is inclined so that the multiphase petroleum fluid which flows therein is stratified at least in part. The data acquisition apparatus 10 of the invention is linked to a surface installation (not shown) via a cable or a flexible rod. The data acquired in the apparatus 10 is transmitted in real time to the surface installation, by telemetry, through the cable or the flexible rod.

In modules not shown and which are not part of the invention, the data acquisition apparatus 10 includes a certain number of sensors, such as pressure or temperature sensors. It also comprises a telemetry system.

In the portion shown in FIG. 1, the data acquisition apparatus 10 comprises a cylindrical body 14 having a diameter that is substantially smaller than the inside diameter of the well 12. The body 14 supports a deployable mechanism 16 that is capable of being deployed in a plane containing the longitudinal axis of said body.

In the embodiment shown in FIG. 1, the mechanism 16 comprises an arm 18 having a downward end hinged on the body 14, and an arm 20 interposed between the other end of the arm 18 and a portion of the body 14 closer to the surface. This end of the arm 20 is capable of being displaced inside the body 14, parallel to its longitudinal axis, by a motor 22. Actuation of the motor 22 enables the mechanism 16 to be displaced between an active position of the apparatus in which said mechanism is deployed in the manner shown in FIG. 1, and an inactive position in which the mechanism 16 is retracted inside the body 14.

In a variant embodiment (not shown), the mechanism 16 can be constituted by a spring mechanism that is automatically deployed when the apparatus is inserted in the well. The motor 22 can thus be omitted.

In the embodiment of FIG. 1, when the apparatus 10 is inserted in an inclined or horizontal well, the body 14 automatically remains in the bottom portion of the well, i.e. against the bottom generator line of the well. When the mechanism 16 is deployed, the mechanism then automatically occupies the entire diameter of the well. Consequently, the arms 18 and 20 forming the mechanism 16 are automatically positioned above the body 14 in a vertical plane containing the longitudinal axis of the well 12.

In a variant, it is possible to fit the body 14 of the apparatus with a magnetic device. The device co-operates with the metal tubing which lines the inside of the well 12 so as to guarantee that the body 14 is properly oriented in the above-mentioned vertical plane.

In each of at least two distinct regions of the well 12, the data acquisition apparatus 10 comprises means for determining the local speed of the multiphase fluid flowing in the well, and means for determining the local proportions of the phases of said fluid. The various regions in which the measurements are taken are not in alignment with one another parallel to the longitudinal axis of the well.

Figure 2:
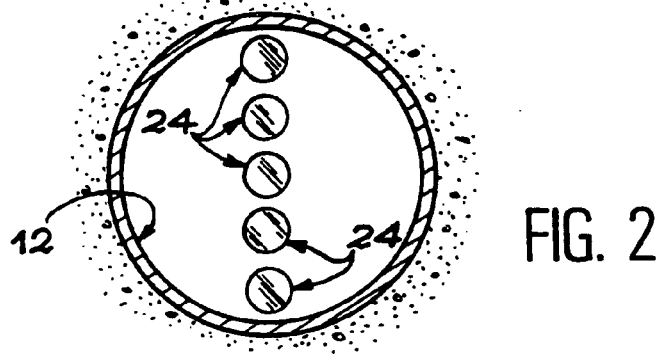
FIG. 2 is a view in diagrammatic section on line II—II of FIG. 1.

More precisely, in the embodiment shown in FIGS. 1 and 2, the apparatus 10 is fitted with five multi-sensor assemblies 24, each including means for determining the local speed of the fluid, and means for determining the local proportions of the phases of said fluid. One of said multi-sensor assemblies 24 is mounted in the body 14 of the apparatus 10 and the other four multi-sensor assemblies 24 are mounted on the arm 18 of the mechanism 16 so as to be distributed evenly across the entire width of the well 12 in the vertical plane containing the longitudinal axis of said well.

One of multi-sensor assemblies 24 mounted on the arm 18 is placed on its end hinged to the arm 20. Consequently, said multi-sensor assembly 24 is situated in the immediate vicinity of the top generator line of the well when the mechanism 16 is deployed.

FIG. 2 is a diagram showing the geometrical distribution of the multi-sensor assemblies 24 over the entire width of the well 12 in the vertical plane containing the longitudinal axis of the well.

In practice, each of the means for determining the local speed of the fluid, contained in the multi-sensor assemblies 24, is constituted by a small spinner (not shown). The multi-sensor assemblies 24 are mounted on the arm 18 of the mechanism 16 so that the axes of the spinners are oriented substantially parallel to the longitudinal axis of the well 12 when the mechanism 16 is deployed. This can easily be obtained by mounting the assemblies 24 on the arm 18 via deformable parallelogram linkages or the equivalent.

In addition, each of the means for determining the local proportions of the phases of the fluid and fitted to each multi-sensor assembly 24, can be constituted by any known means capable of performing this function. Such known means include, in particular, resistivity sensors as described in document EP-A-0 733 780, optical sensors as described in document FR-A-2 749 080, or multiple sensors including two or three optical sensors, or one optical sensor and a resistivity sensor, for example.

In the embodiment in FIGS. 1 and 2, each of the means for determining the local proportions of the phases can, in particular, be placed in the center of the small spinner serving to measure the local speed of the fluid.

Using the arrangement described above, there are made available both a measurement of the local speed of the fluid and data representative of the local proportions of the phases in each of the local regions occupied by the multi-sensor assemblies 24. In each of the regions in which the multi-sensor assemblies 24 are situated, the flow rate value of each of the phases entering into the composition of the petroleum fluid circulating in said region of the well can therefore be calculated accurately. The total flow rate is then determined for each of the phases by adding together, for the all of the regions, the values of the previously calculated flow rates.

A measurement is thus obtained of said flow rates that is substantially more accurate than the measurement obtained with prior art apparatus, regardless of whether the well is vertical or whether it is inclined or horizontal.

The method of determining the overall flow rate is based on experimental observation whereby, in an inclined or horizontal well, the various phases are stratified along substantially horizontal separation lines in a vertical section of the well. Thus, the total section of the well can be divided into a plurality of section elements Δs having horizontal sides. A multi-sensor assembly 24 is associated to each of said section elements Δs. On this basis, the overall or total flow rate of any given phase is equal to the sum of the flow rates of said phase calculated over all the section elements Δs. In other words, in the case where three multi-sensor assemblies 24 are used associated with three respective section elements Δs1, Δs2, and Δs3, the overall flow rate Q is given by the relationship:

$$Q = q_1 \cdot \frac{\Delta s1}{S} + q_2 \cdot \frac{\Delta s2}{S} + q_3 \cdot \frac{\Delta s3}{S}$$

where S represents the total vertical section of the well and $q_1$, $q_2$, and $q_3$ represent the flow rates of the phase under consideration in each of the respective section elements Δs1, Δs2, and Δs3, each of said flow rates being equal to the product of the local speed $v_1$, $v_2$, and $v_3$ of the phase under consideration multiplied by the local proportion $h_1$, $h_2$, and $h_3$ of said phase.

Figure 3:
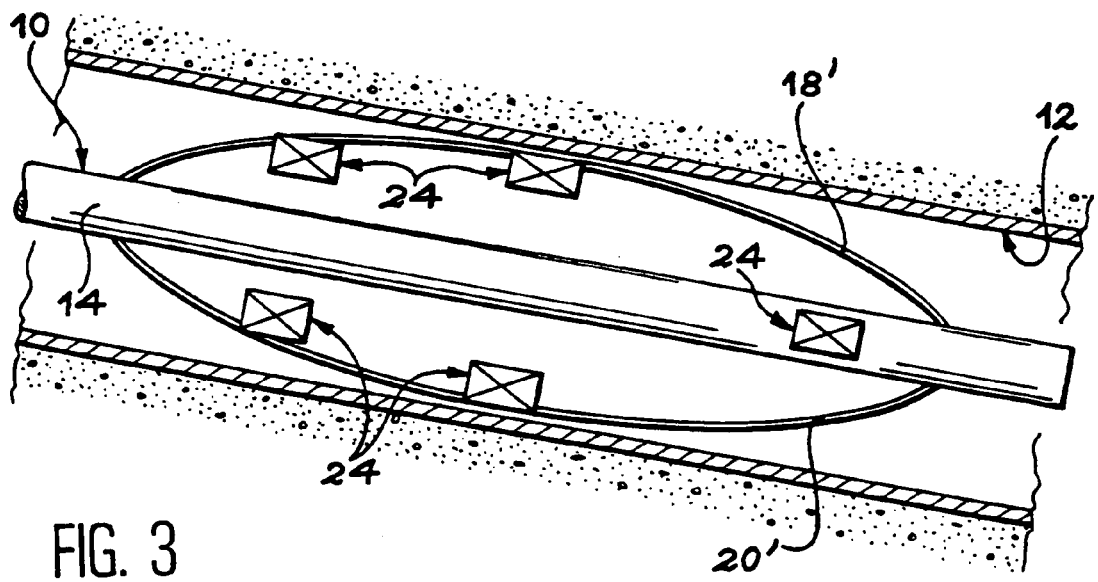
FIG. 3 is a view similar to FIG. 1 showing another embodiment of the invention.

FIG. 3 is a diagram showing another embodiment of the apparatus 10 of the invention.

In this case, the body 14 of the data acquisition apparatus 10 is centered about the longitudinal axis of the well 12 via at least two arms 18' and 20' situated in locations that are diametrically opposite about the longitudinal axis of the body 14. As mentioned above, the arms 18' and 20' can be arms that are hinged, deployed, or folded by means of a motor mounted in the body 14, or they can be arms forming springs as shown in FIG. 3.

In this second embodiment, the arms 18' and 20' are mounted on the body 14 of the apparatus 10, for example by means of a mechanism enabling said arms to be oriented automatically so as to be situated in the vertical plane containing the longitudinal axis of the well 12 when the well is inclined or horizontal. Such a mechanism (not shown) can, in particular, comprise a rheostat with a plumb weight delivering a signal representative of the vertical direction. A motor sensitive to said signal thus imparts the desired orientation to the arms 18' and 20'.

In the embodiment in FIG. 3, multi-sensor assemblies 24 are mounted in the body 14 and on each of the arms 18' and 20' so as to take measurements in distinct regions of the well, that are evenly distributed over the entire width of the well in a single, vertically-oriented plane containing the longitudinal axis of the well.

In the particular case of FIG. 3, a multi-sensor assembly 24 is mounted in the body 14 of the apparatus 10 and two multi-sensor assemblies 24 are mounted on each of the arms 18' and 20'. More precisely, each of the arms 18' and 20' supports a multi-sensor assembly 24 in the immediate vicinity of the walls of the well 12, i.e. of the top and bottom generator lines of the well. Each of the arms 18' and 20' also supports a multi-sensor assembly 24 in a location such that it is positioned radially, substantially mid-way between the body 14 of the apparatus and the bottom and top generator lines of the well.

In a variant, the multi-sensor assembly 24 mounted in the body 14 of the apparatus 10 can be omitted and replaced by two multi-sensor assemblies 24 symmetrically mounted in the immediate vicinity of the body 14 on each of the arms 18' and 20'.

Figure 4:
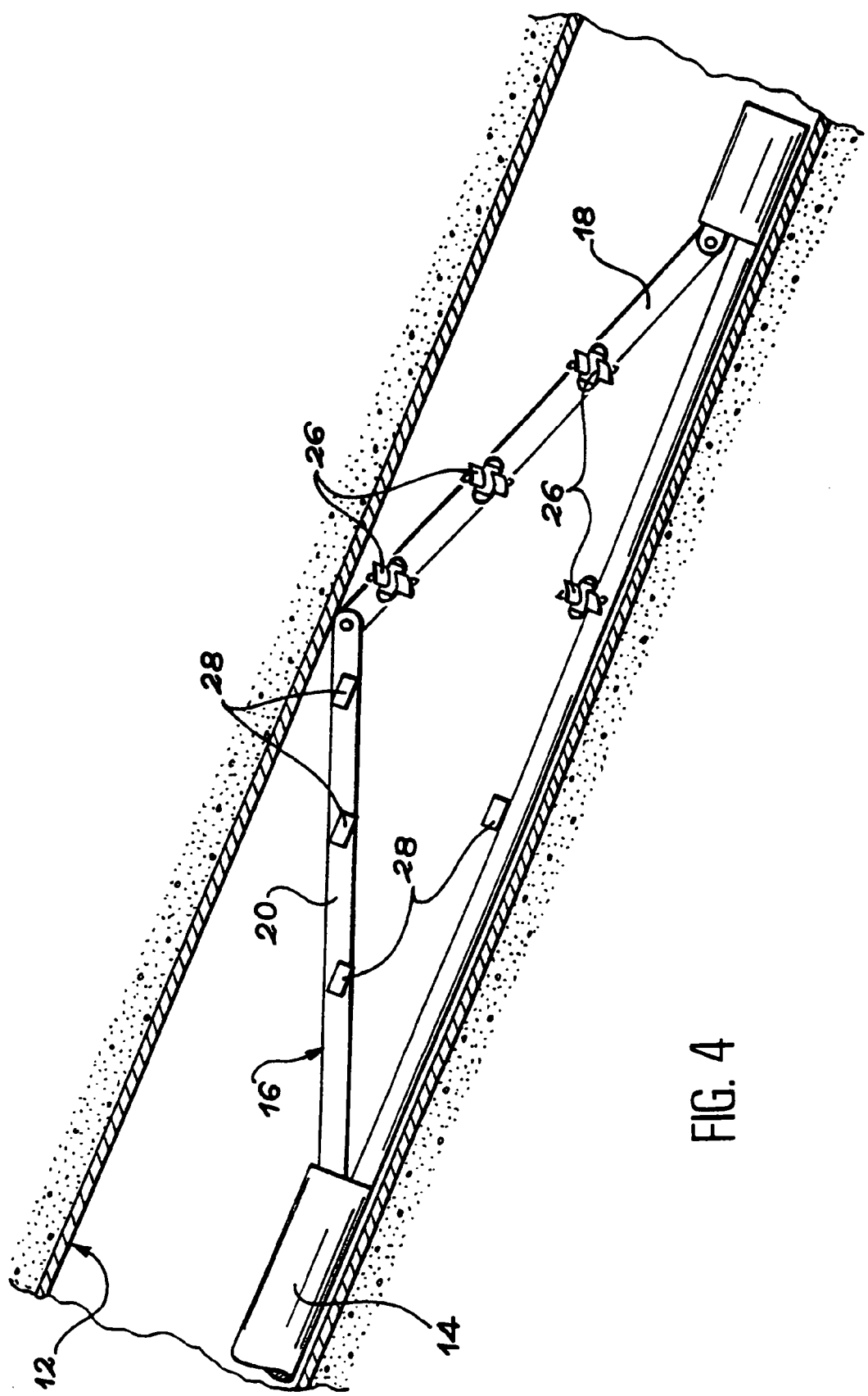
FIG. 4 is a section view similar to FIG. 1 showing a variant of the first embodiment.

FIG. 4 is a diagram showing a variant of the first embodiment of the invention.

This variant differs from the embodiment previously described with reference to FIGS. 1 and 2 essentially in that the means for determining the local speed of the fluid and the means for determining the local proportions of the phases are situated in various locations, instead of being included in the multi-sensor assemblies.

More precisely, the mini-spinners 26 forming the means for determining the local speed of the fluid are mounted on the body 14 and on the arm 18, while the local sensors 28 forming the means for determining the local proportions of the phases of said fluid are mounted on the body 14 and on the arm 20. In this case, a mini-spinner 26 and a local sensor 28 are mounted on the body 14 of the apparatus 10 while three mini-spinners 26 and three local sensors 28 are mounted on the arms 18 and 20 of the mechanism 16.

As mentioned above, the mini-spinners 26 and the local sensors 28 are grouped together in pairs so that each assembly formed by a mini-spinner 26 and by a local sensor 28 takes measurements in locations that are in alignment with each other parallel to the longitudinal axis of the well 12, i.e. in the same measurement region for the fluid which flows in the well. In addition, as mentioned above, the measurements taken by the various assemblies formed by a mini-spinner 26 and a local sensor 28 are taken in distinct regions, i.e. not in alignment with each other parallel to the axis of the well 12.

As in the previously-described embodiments, the regions in which the measurements are taken are evenly distributed over the entire width of the well and situated approximately in the same plane containing the axis of the well and oriented in a direction that is substantially vertical whenever the well is inclined or horizontal.

The variant embodiment of FIG. 4 presents the same advantages as the two embodiments described with reference to FIGS. 1 to 3. In addition, it enables the apparatus to be simplified by mounting the mini-spinners and the local sensors in locations that are physically different from the apparatus.

Naturally, the invention is not limited to the embodiments described above by way of example. Thus, it is understood, in particular, that mounting the means for determining the local speed of the fluid and the means for determining the local proportions of the phases in distinct locations, as described with reference to FIG. 4, can also apply to the second embodiment as described with reference to FIG. 3.

The invention claimed is:

1. A method of determining flow rates in a multiphase fluid flowing in a well, comprising:
    positioning an apparatus in the well, said apparatus being provided with a main body portion that automatically lies in the bottom of the well when said well is inclined or horizontal the well having a longitudinal axis, the bottom of the well being deed by the bottom generator line of the inclined or horizontal well;
    providing said main body portion with a first pair of sensors, said pair comprising a speed sensor for measuring local speed of the flowing fluid and a proportion sensor for measuring local proportions of the flowing fluid;
    measuring with said first pair of sensors in the vicinity of said main body portion a first pair of measurements:
    (a) the local speed of the flowing fluid; and
    (b) the local proportions of the flowing fluid;
    measuring in a first region of the well a second pair of measurements:
    (c) the local speed of the flowing fluid in a first location of the well; and
    (d) the local proportions of the flowing fluid in a second location of the well, such that said first and second locations are in alignment with each other on a line parallel to the longitudinal axis of the well;
    measuring simultaneously in a second region of the well a third pair of measurements of said local speed and said local proportions, wherein the first and the second regions are in the same plane containing the longitudinal axis of the well.

2. A method as claimed in claim 1, wherein said first and second regions are distributed across the entire width of the well.

3. A method according to claim 1, wherein said plane containing the longitudinal axis of the well is oriented in a direction that is substantially vertical.

4. A method as claimed in claim 1, wherein the well is inclined from vertical, the method comprising measuring a second pair of local speed and local proportions of the flowing fluid in a first region lying at the bottom of the vertically oriented plane of the well, and measuring third pairs of local speed and local proportions of the flowing fluid in second regions distributed across the entire width of the well in the vertically oriented plane.

5. A method as claimed in claim 1, in which a section element ($\Delta s_i$) of the well is assigned to each region, and the overall flow rate Q of each phase is determined from the relationship:

$$Q = \sum_i q_i \cdot \frac{\Delta s_i}{S}$$

where S is the total vertical section of the well
and $q_i$ is the flow rate of each phase in section element $\Delta s_i$, with $q_i = v_i \cdot h_i$
where $v_i$ is the local speed of each phase in section element $\Delta s_i$
and $h_i$ is the local proportion of each phase in section element $\Delta s_i$.

6. A method as claimed in claim 1, wherein said first and second locations are at the same point in each first and second regions.

7. Apparatus for determining flow rates in a multiphase fluid flowing in a well, the well having a longitudinal axis, comprising:
    a tool body to be positioned in the well, said tool body comprising:
        a main body portion that automatically lies in the bottom of the well when said well in inclined or horizontal, the bottom of the well being defined by the bottom generator line of the inclined or horizontal well; and
        at least a deployable arm that is supported by the main body portion at one end and that can be deployed from a position inside said main body portion to a position where it occupies the entire diameter of the well;
    a first sensor pair mounted on said main body portion, said first sensor pair comprising a speed sensor for measuring local speed of the flowing fluid in the vicinity of said main body portion and a proportion sensor for measuring the local proportions of the flowing fluid in the vicinity of said main body portion;
    a second and a third sensor pairs, each sensor pair comprising:
    speed sensor mounted on the deployable arm for measuring local speed of the flowing fluid in a first location of the well; and
    proportion sensor mounted on the deployable arm for measuring local proportions of the fluid flowing in a second location of the well;

wherein said speed and proportion sensors are arranged such that said first and second locations are in alignment with each other on a line parallel to the longitudinal axis of the well;
wherein said second and third sensor pairs lie in the same plane containing the axis of the well.

8. Apparatus as claimed in claim 7, wherein when the well is inclined from vertical, said plane containing the longitudinal axis of the well is oriented in a direction that is substantially vertical and the second pair of speed and proportions sensor means lies at the bottom of said vertically oriented plane.

9. Apparatus as claimed in claim 7, wherein each pair of the speed sensor means and the proportions sensor means are included in multi-sensor assemblies.

10. Apparatus as claimed in claim 7, wherein, when the well is inclined or horizontal, the main tool body rests under the influence of gravity against the bottom of the well, and the deployable arm is applied against the top of the well.

11. Apparatus as claimed in claim 7, wherein, in use, the main body portion is centered about the longitudinal axis of the well by said at least one deployable arm and by a second deployable arm mounted on the main body portion, said first one and second deployable arms being capable of being applied respectively against the bottom and top of the well.

12. Apparatus as claimed in claim 7, wherein, in use, said second and third pairs of speed and proportions sensor means are distributed across the entire width of the well.

13. Apparatus as claimed in claim 12, further comprising a pair of speed and proportions sensor means lying at the top of the vertically oriented plane of the well.

* * * * *